Dec. 9, 1947.  C. ADLER, JR  2,432,078
AIRPLANE HORN
Filed April 4, 1946
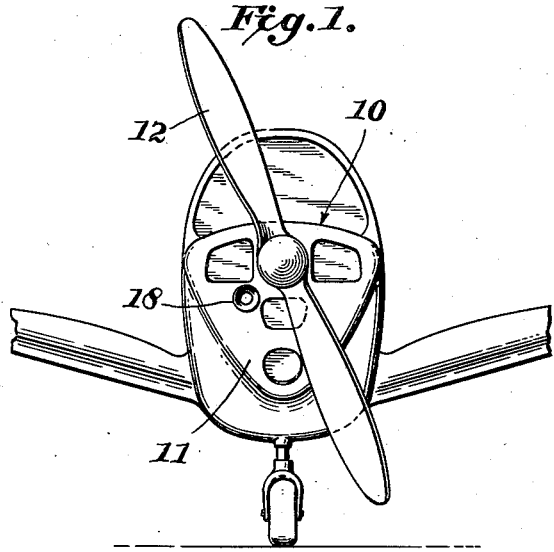
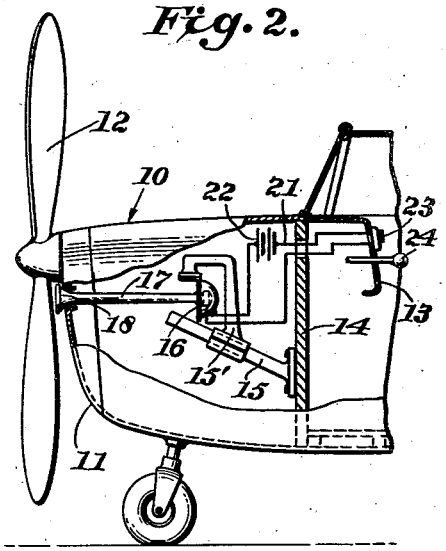
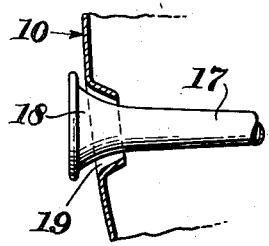
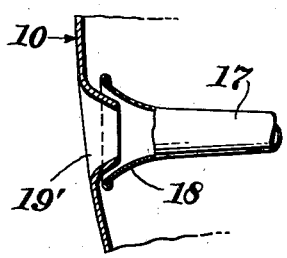
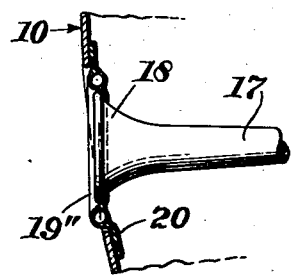
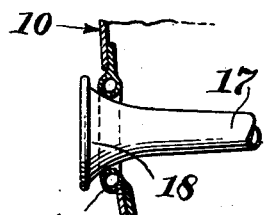
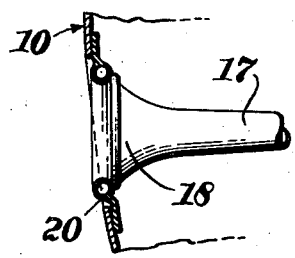
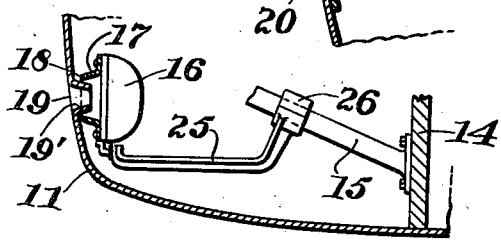
Inventor:
Charles Adler, Jr.,
By Cushman, Darby & Cushman
Attorneys.

Patented Dec. 9, 1947

2,432,078

UNITED STATES PATENT OFFICE 2,432,078

AIRPLANE HORN

Charles Adler, Jr., Baltimore, Md.

Application April 4, 1946, Serial No. 659,484

1 Claim. (Cl. 244—117)

The present invention relates to improvements in aircraft, and is primarily concerned with achieving a dependable control of operations while aircraft are (1) in flight, (2) landing or taking off, and (3) taxiing or stationary on the ground.

It is realized that, at the present time, no simple means carried by aircraft are available for informing pilots in flight, ground personnel at an airport or people and traffic on the ground of the proximity of aircraft or the intentions of their pilots.

As an illustration of the necessity for a device which will meet this need and be carried by the aircraft, one has only to observe how frequently pilots have sacrificed their lives rather than injure people or property when forced down. It is well known, and in fact within my own experience, that in many cases of engine failure in flight, a safe landing could have been effected on boulevards, race tracks, and golf courses, if such areas could have been cleared sufficiently and in time of people or traffic.

I have used the present invention successfully, for instance, in flying the traffic pattern about an airport preparatory to making a landing. Thus, when there is a ship ahead, I have operated the invention to advise its pilot that I am in the rear so that he will not turn suddenly and cut me off. Also, when making a final approach to the field and gliding in for a landing behind and to the side of another aircraft, I have been able to inform the other pilot that I am behind him so that when he has completed his landing run, he will not turn his ship into my path. I have also found the present invention to be of advantage when about to take off. For instance, in the case of land based aircraft, it is important to warn all personnel in the vicinity that the propeller is to be started and therefore to stand clear of the aircraft. In the case of seaplanes, it is equally important both in the case of landing or taking off that surface craft, as well as personnel be advised.

The present invention consists in overcoming the objectionable conditions described above by the provision of means for producing audible sound incorporated as permanent part of the aircraft. A number of fundamental and critical improvements are embodied in the invention, whereby (1) drag is minimized, (2) the mounting of the sound producing means on the aircraft is accomplished in a manner to assure its optimum efficiency without substantial muffling, (3) the sound producing device is instantaneously effective and independent of the operation of the engine, (4) the operating means for the audible device are simple and located at a readily accessible point to the pilot's position in the aircraft, (5) the operating means assures the instant actuation of the sound producing means, and (6) the sound producing means create a vibratory note of uniform intensity or tone quality suitable for sending in "Morse code," since many airports as well as aircraft are without radio sending apparatus.

I have discovered that by fixedly supporting a sound-producing mechanism within the nose of the aircraft, and disposing the sound emitting outlet so that it opens directly into an opening in the nose, the drag is negligible, and of particular importance there is practically no muffling of the sound. In fact, the nose of the aircraft acts to reflect the sound downwardly and outwardly with respect to the nose. Moreover, I have discovered that the efficiency of such audible means is enhanced by freely suspending the sound emitting outlet as close to the center of the propeller slip stream as possible, i. e., such location of the sound emitting outlet reduces slip stream distortion of sound to a minimum. This is true in the case of both single engine and multiple engine aircraft since in the latter instance, the sound emitting outlet on the nose is centrally disposed with respect to the slip stream created by propellers on the wings. An electrical sound producing device is utilized capable of instantaneously producing audible sound upon pressing a simple push-button or switch which is located proximate to the throttle where it may be operated by the pilot with the same hand used for the throttle. The electrical sound means produces a vibratory note of uniform intensity or tone quality as stated above, whereby it may be used for sending in "Morse code", for instance, to advise an airport of mechanical failure and/or to request that runway lights be turned on when an approach is being made after dark.

The present invention reaches into a real and existing problem, and provides a simple and dependable solution embodying means carried by the aircraft and including improvements and features distinct from the mere application of audible means to a vehicle.

In the accompanying drawing, I have shown a preferred form of the invention and it is to be understood that the particular construction of the sound producing device or the specific means for mounting the same are subject to considerable modification.

Referring to the drawing:

Figure 1 is a front elevational view looking at the nose of a single engine aircraft.

Figure 2 is a side elevation with the engine cowling broken away to illustrate the mounting of the audible means.

Figure 3 is a fragmentary view partly in section of the nose opening and audible device shown in Figure 1.

Figures 4 to 7 are views similar to Figure 3 showing modifications, and

Figure 8 is a fragmentary view of a further and preferred modification.

The aircraft 10 includes the nose 11 within which is located a suitable engine (not shown), for operating the propeller 12. The control board in the cockpit is indicated at 13 and the fire wall at 14 while the engine mount is shown at 15.

Sound producing means 16 are fixedly supported within the nose by attachment to the engine mount 15 and fire wall 14 through the medium of any suitable bracket or clamp 15'. Preferably, the bracket 15' is made of metal and its connection to the metal engine mount 15 is such as to create a maximum of sounding board effect. The sound producing means is electrically operated and of the vibratory type, and preferably produces a note of uniform intensity or tone quality in order that the messages may be sent in "Morse code," as indicated above.

A sound emitting means 17 is connected to the sound producing mechanism either permanently or detachably and terminates in a preferably outwardly flared sound emitting outlet 18. The outlet 18 opens directly into an opening 19 formed in the nose, and the outlet is disposed substantially concentrically with the nose opening. This opening, as shown in Figure 1, is located as close as possible to the center of the slip stream of the propeller so as to assure against distortion of the sound and enable use of the outer wall of the nose as a sound reflecting means. The outlet 18 and sound emitting means are freely suspended from the sound producing mechanism so as to avoid any damping of vibrations which would decrease the volume and intensity of the sound.

In Figures 3 and 4, the opening 19 is defined by the inwardly flared portion 19' of the nose and the outlet 18 is positioned to terminate slightly beyond the opening 18 or terminate within the nose in telescopic relation to the flared portion 19', but the outlet always opens directly and concentrically into the opening 19 and is freely supported by the mechanism 16.

In Figures 5, 6 and 7 a sealing means 20 is utilized of a character which does not support the outlet 18 but simply seals the opening 19 as shown at 19" so as to avoid damping of vibrations.

In Figure 6, the outlet extends slightly beyond the nose while in Figure 5, the end of the outlet 18 is disposed substantially flush with the wall of the nose.

In Figure 7, the outlet 18 is disposed slightly to the rear of the wall of the nose.

In all cases, the outlet 18 and means 17 are freely mounted on the mechanism 16, and the outlet 18 opens directly into the opening 19 of the nose, being disposed substantially concentric with the nose opening, and the nose constitutes a sound reflecting means.

The sealing material 20 is soft, flexible and resilient or of any character which will not exert a damping effect when forming the seal between the outlet 18 and opening 19 as shown. The tube or sound emitting means 17 is rigidly supported only by the sound producing mechanism 16 and at one end, as shown.

The sound producing mechanism is electrically operated by means independent of the aircraft engine, an electrical circuit 21 including a battery 22 and push-button 23 being utilized. Thus, even should the engine fail, the sound producing device is instantly operative. The push-button 23 is located proximate to the throttle 24 whereby it may be operated by the pilot with the same hand that is used for the throttle and without requiring that his other hand be removed from the aileron elevator control.

The relation between the flared outlet 18 of the sound means and the flared inlet 19 on the nose is somewhat exaggerated, since the space between the two is relatively slight, being, however, sufficient to preclude the nose or sealing member 20 from acting as a support for the flared outlet to thereby damp vibrations.

Referring to Figure 8, the sound producing mechanism 16 and sound emitting means 17 are disposed proximate to the opening 19 in the nose. The opening may be of any desired form, as shown herein, but is preferred flared and the sound emitting outlet 18 telescopically receives the flared portion 19' of the nose, as shown. If desired, the flared portion of the nose will telescopically receive the sound emitting means 17—18, as shown in Figure 3, but the preferred construction is in accordance with Figure 8. It will be noted that instead of an elongated sound emitting means 17, the sound emitting means 17 of Figure 8 is relatively short. As in the case of the other sound emitting outlets 18, the outlet in Figure 8 opens directly into the nose opening and is disposed substantially concentric therewith.

The sound producing mechanism 16 is mounted on a bracket 25 which, in turn, is connected to the engine mount 15 and fire wall 14 by a suitable clamp 26. The mounting of the sound producing mechanism is such as to create a maximum of sounding board effect and the sound emitting means and sound emitting outlet are freely suspended so as to avoid any damping of vibrations which would decrease the volume and intensity of the sound.

In all of the constructions illustrated in the drawings, the opening 19 and the outlet 18 are positioned as close to the center of the propeller slip stream as possible in order to reduce to a minimum the possibility of sound distortion.

Referring to Figure 2, it will be noted that the sound producing mechanism 16 is located as close to the center of gravity of the aircraft as possible, while in Figure 8, the sound producing mechanism is further away from the center of gravity of the aircraft. This is compensated for by the lightness of the sound producing mechanism and its associated sound emitting means.

I claim:

In combination with an aircraft having a nose, of sound means associated with the aircraft, said sound means comprising sound producing mechanism fixedly supported within the nose, said nose having an opening and sound emitting means connected to said mechanism at one end and having an outlet end directly opening into the said opening in the nose, the outer wall of the nose constituting reflecting means for sound from said sound emitting outlet, said sound producing mechanism being instantaneously electrically operable for producing sound, and actuating means for said sound producing mechanism.

CHARLES ADLER, JR.

REFERENCES CITED

The following references are of record in the file of this patent:

UNITED STATES PATENTS

| Number | Name | Date |
|---|---|---|
| 1,324,784 | Barr | Dec. 16, 1919 |
| 1,628,230 | Coburn et al. | May 10, 1927 |
| 1,667,206 | Kersten | Apr. 24, 1928 |
| 1,667,287 | Coburn et al. | Apr. 24, 1928 |
| 1,667,300 | Adair et al. | Apr. 24, 1928 |
| 1,778,206 | Ames | Oct. 14, 1930 |
| 1,781,266 | Bruni | Nov. 11, 1930 |
| 2,018,740 | Pellegatti | Oct. 29, 1935 |
| 2,060,911 | Voigtlander | Nov. 17, 1936 |
| 2,392,394 | Lear | Jan. 8, 1946 |

FOREIGN PATENTS

| Number | Country | Date |
|---|---|---|
| 603,459 | France | Jan. 9, 1926 |